UNITED STATES PATENT OFFICE.

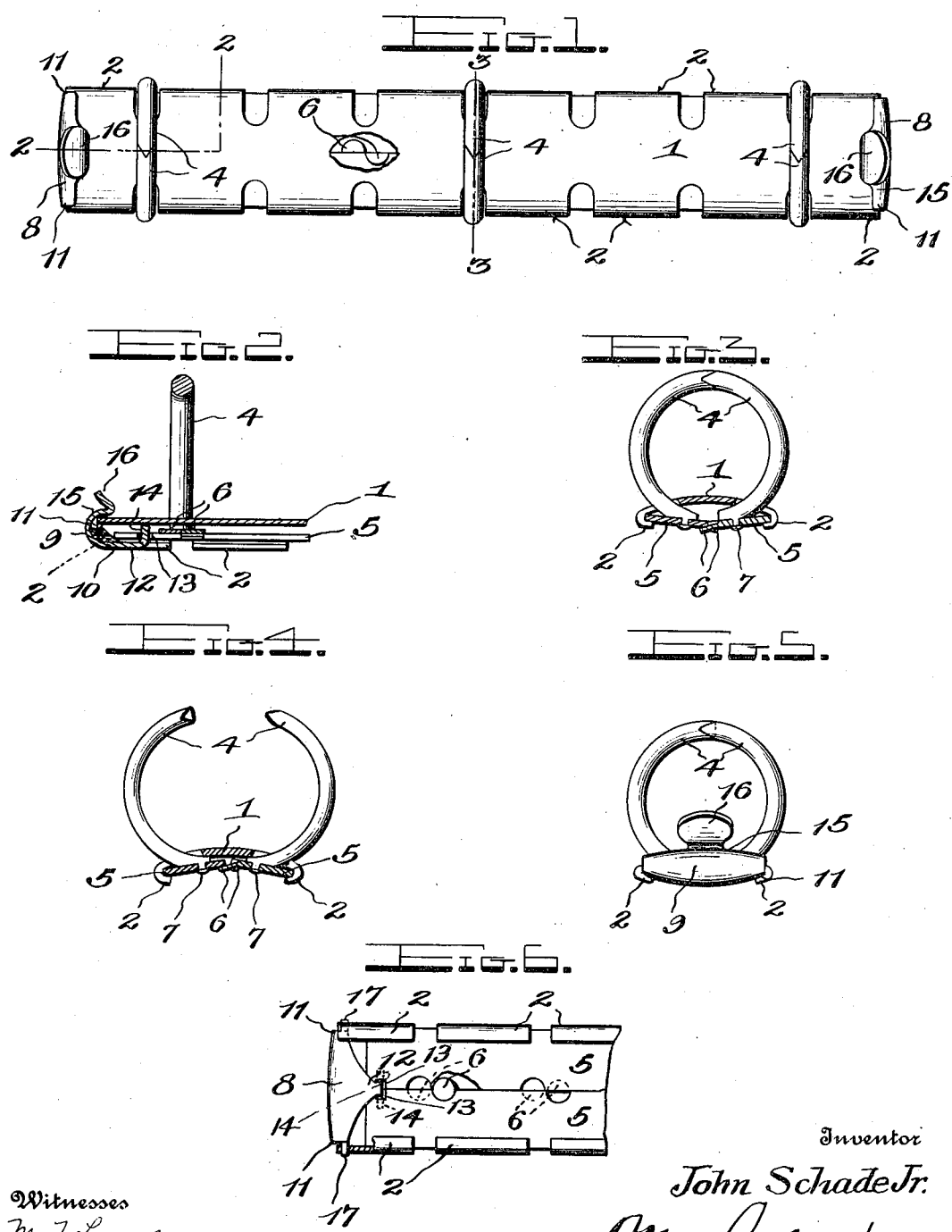

JOHN SCHADE, JR., OF BROOKLYN, NEW YORK, ASSIGNOR TO NATIONAL BLANK BOOK COMPANY, A VOLUNTARY TRUST ASSOCIATION OF COPARTNERSHIP, HAVING AS TRUSTEES J. W. TOWNE, F. B. TOWNE, E. S. TOWNE, J. M. TOWNE, AND F. W. WILSON, ALL OF HOLYOKE, MASSACHUSETTS.

LOOSE-LEAF BINDER.

1,140,534.

Specification of Letters Patent. Patented May 25, 1915.

Continuation of application Serial No. 836,835, filed May 6, 1914. This application filed July 27, 1914. Serial No. 853,434.

*To all whom it may concern:*

Be it known that I, JOHN SCHADE, Jr., a citizen of the United States, residing at the city of Brooklyn, county of Kings, and State of New York, have invented certain new and useful Improvements in Loose-Leaf Binders; and I do declare the following to be a full, clear, and exact description of the invention, such as will enable others skilled in the art to which it appertains, to make and use the same.

This invention relates to certain new and useful improvements in loose leaf binders, but particularly relates to that class of binders comprising prongs which are carried by hinged leaves the latter along their outer edges being supported within a resilient housing.

In the drawings: Figure 1 is a top plan view of the invention, partly broken away to show one of the complete hinge lips; Fig. 2 is a section taken on the line 2—2 of Fig. 1; Fig. 3 is a section taken on the line 3—3 of Fig. 1; Fig. 4 is a view similar to Fig. 3, but showing the prongs in open position; Fig. 5 is an end elevation; and Fig. 6 is a fragmentary top plan view, partly broken away and in section of a modified form of one of the operating levers.

In proceeding in accordance with the present invention, a resilient housing is provided which consists of a plate 1, of slightly concavo-convex form in cross-section, the sides of which are slotted and bent inwardly to extend below the upper face of the housing plate, as indicated at 2, to thus provide sides for the housing. A pair of hinge members or leaves 5 formed of metal strips are arranged to have their inner sides in engagement with each other and to have their outer sides engaged with and between the sides 2, of the housing plate 1.

The members or leaves 5 are hingedly connected so that same may move from the position shown in Fig. 3 to that shown in Fig. 4, and vice versa, by providing each leaf 5 with lips 6 which are formed integral with the respective leaves 5 and engage beneath the opposite leaf. The prongs 4 have base portions which seat on the upper faces of the leaves 5 and are riveted at 7 to the latter.

For the purpose of positively moving the prongs out of closed or locked position, a pair of operating levers 8 are provided, which levers also serve to provide closures for the ends of the housing to prevent the ingress of dirt, dust and other foreign matter. As depicted in Fig. 2 of the drawings, the levers have central body portions 9 which extend across the ends of the housing, and have their lower portions 10 extended inwardly beneath the leaves 5, and have their side extremities 11 pivotally hung around the ends of the housing plate 1. The portions 10 of the levers may be provided with contracted parts 12 the free extremities of which can be passed upwardly through alining apertures 13 formed in the confronting longitudinal edges of the leaves 5, and toes 14 may be provided overlapping each of the leaves 5, but I make no claim to any such construction of these levers since I am aware that the same is not new. Neither do I claim as my invention the provision of the extensions 10 beneath the leaves, since I am aware that the operation of the leaves by means of levers, for the purpose of either opening or closing the prongs is old, my invention, so far as these levers are concerned, being limited to the pivoting of these levers at the ends of the housing in such manner that said levers will act as end caps to keep out dirt and dust while at the same time they will be capable of operation to open the prongs. The ends of the housing plate provide fulcrums for the levers 8, and in order to afford means for readily operating the levers, the latter are formed with upper portions 15 which are extended above the housing plate and bent into finger grips 16.

In Fig. 6 of the drawings a modified form of the invention is shown in which the lever 8 is provided with trunnions 17 which project through apertures provided for the reception thereof in the sides or flanges 2.

The leaves 5 being confined at their outer side edges by the flanged sides 2 of the housing plate, the flanged sides will yield upon both opening and closing of the prongs, and the moment the line of hinging of the leaves 5 passes above or below a given plane, corresponding to a dead center, the parts 2 recover and thereby effect corresponding movements of the prongs.

What is claimed is:—

1. A loose leaf binder, comprising a resilient housing, hinged prong carrying members within the housing, and combined means for closing the ends of the housing and for positively operating said members to open the prongs.

2. A loose leaf binder, comprising a resilient housing, hinged prong carrying members within the housing, and levers having pivotal supports at the ends of said housing and having portions which close said ends, said levers having extensions beneath the hinge members for positively operating the latter to open the prongs.

3. A loose leaf binder, comprising a resilient housing, prong carrying members within the housing having their longitudinal side edges arranged in side by side relation, and levers fulcrumed on the ends of the housing and having parts which close the ends of said housing, the lower portions of said levers engaging the under faces of said members whereby the latter are positively opened by the lever movements.

4. In a loose leaf binder, a resilient housing, a pair of hingedly connected prong bearing elements in the housing, and means movably connected to the ends of the housing to close the latter and to engage below each of said elements for positively moving the latter into position to open the prongs.

In testimony whereof I affix my signature in presence of two witnesses.

JOHN SCHADE, Jr.

Witnesses:
JOSEPH M. TOWNE,
HENRY A. ROBERTS.